Patented Feb. 12, 1952

2,585,444

UNITED STATES PATENT OFFICE 2,585,444

PREPARATION OF SHAPED ARTICLES FROM ACRYLONITRILE POLYMERS

Charles D. Coxe, Bridgeport, Conn., assignor to E. I. du Pont de Nemours & Company, Wilmington, Del., a corporation of Delaware No Drawing. Application July 29, 1948, Serial No. 41,412

7 Claims. (Cl. 18—54)

This invention relates to the production of shaped articles from acrylonitrile polymers. Further, it relates to the formation of compositions of acrylonitrile polymers which may readily be shaped into articles. More particularly, it relates to the formation of shaped articles from acrylonitrile polymers by the use of non-solvent impregnants.

By "shaped articles" is meant monofils, filaments, fibers, yarns, films, ribbons, threads, tubes, etc. By "non-solvent impregnants" is meant materials which are not solvents for the acrylonitrile polymers yet which facilitate the formation of shaped articles therefrom, presumably by decreasing the friction between surfaces as the polymer is forced through the shaped orifices.

Polyacrylonitrile and copolymers or interpolymers of acrylonitrile in which at least 85% by weight of the polymer is acrylonitrile have been known for some time. These possess desirable physical and chemical properties including toughness, insolubility and insensitivity to common solvents, such as water, methyl or ethyl alcohol, acetone, ethyl ether, ethyl acetate, hydrocarbon solvents, chlorinated hydrocarbons and the like. Because of these facts, numerous attempts have been made to form yarns, films and other shaped articles from these polymers. The invention of George H. Latham disclosed in U. S. 2,404,714 represents the first successful preparations of acrylonitrile polymer solutions which are suitable for the production of commercially useful textile yarns or wrapping tissues and films with similar tough, flexible properties.

The solvents disclosed by Latham and other known solvents for acrylonitrile polymers, however, are expensive. Therefore, economic utilization of these solvents to form shaped articles necessitates an expensive recovery set-up. While this does not prevent commercialization of acrylonitrile polymers, it is very desirable to provide more convenient and more economical processes for the production of shaped articles.

Polyacrylonitrile and its copolymers and interpolymers containing a major portion of acrylonitrile are quite unlike other polymers such as other vinyl polymers and synthetic cellulose compositions. The acrylonitrile polymers of this invention are relatively unreactive, insoluble and hydrophobic compounds. These polymers consistently present exceedingly difficult problems, for example, in the formation of solutions therefrom, in the dyeing of shaped articles therefrom, and in the formation of shaped articles therefrom.

An object of this invention is to form shaped articles from infusible acrylonitrile polymers by the use of non-solvent impregnants. A further object is the provision of a process for preparing yarns, films, monofils, and bristles and other shaped articles from polyacrylonitrile and its copolymers without using solvents. A still further object is the provision of a process for making shaped articles from polymers of acrylonitrile utilizing non-solvent impregnants to facilitate the formation of such shaped articles.

These objects may be accomplished by impregnating finely-divided, or comminuted acrylonitrile polymers containing at least 85% by weight of acrylonitrile with a suitable non-solvent impregnant, heating the mixture of polymer and impregnant to the desired temperature and then extruding the flowable composite through a shaped orifice by means of pressure and then coagulating. The impregnants of this invention comprise water. This is not a solvent for the acrylonitrile polymers. Other impregnants may be used in conjunction with water.

Heated air or other evaporative or coagulative medium is circulated in the cell into which the composite is extruded to assist in coagulating the shaped article and/or evaporating or removing the impregnant. Removal of the impregnant may be negligible or complete depending upon the type of product desired. By this invention, there are produced, for example, fibers, monofils or yarns of acrylonitrile polymers, such as of polyacrylonitrile useful for bristles, screening, etc. The filaments may be after-stretched or otherwise subjected to finishing operations generally used in the textile art.

The following example, in which parts are by weight unless otherwise specified, is given for illustrative purposes and is not to be considered as limitative in any way:

*Example*

Dry, powdered polyacrylonitrile having a molecular weight of 60,000 is soaked in water at room temperature for one hour and then filtered and pressed to remove excess water. After pressing, the filter cake contained 81% water. The filter cake is then placed in an autoclave equipped with a one-hole (0.35 millimeter) spinneret. The temperature of the autoclave and contents is then heated to 110° C. and the pressure is raised to 500 lb. per square inch. This temperature and pressure are maintained until equilibrium conditions are obtained. When excess steam no longer evolves from the spinneret hole, the pressure is increased to 18,000 p. s. i. and the temperature raised to 150° C. The impregnated polyacrylonitrile is extruded downwardly through the spinneret into a tubular-heated spinning cell through which hot air circulates in an upward direction. The solidified monofil of acrylonitrile polymer issuing from the bottom of the cell is collected on a rotating bobbin. Analysis of the yarn shows that it contains 25.6% nitrogen which is the approximate percentage in acrylonitrile polymer. This shows that the polymer has not been hydrolyzed by the spinning conditions.

If a spinneret containing a plurality of holes is used, a multi-filament is produced, and if a narrow slot is used as the orifice, a film is obtained. If the polymer and water (equivalent to 81%) are placed separately in the cell and the experiment is repeated substantially as described above, decomposition of the polymer occurs with either the production of no monofil at all or of a monofil having very poor strength, bad color and irregular properties, all of which are due, in part, to decomposition of the polymer. If no water is used, the polymer cannot be melt spun even at 220° C. and 20,000 pounds per square inch pressure.

Although this invention has been described with particular regard to polyacrylonitrile, the process of this invention is equally useful in the spinning or shaping of such acrylonitrile copolymers and interpolymers as have heretofore been well-known in the art, i. e. acrylonitrile copolymers and interpolymers containing at least 85% by weight of acrylonitrile. It is, therefore, within the scope of this invention to form shaped articles by the process of this invention from copolymers and interpolymers in which acrylonitrile is copolymerized or interpolymerized with polymerizable substances such as, for example, compounds containing one or more ethylenic linkages, e. g. vinyl acetate, vinyl chloride, acrylic acid and its esters and homologs, styrene, vinyl pyridines, isobutylene, butadiene, as well as other vinyl and acrylic compounds, other olefinic or diolefinic hydrocarbons, etc. and polymers from such substances.

Polyacrylonitrile and its copolymers for use with this invention are preferably prepared by the reduction activated ammonium persulfate catalyzed polymerization of monomeric acrylonitrile with or without other monomeric materials dissolved or emulsified in water. It can, however, be prepared by any other suitable type of polymerization reaction such as, for example, the emulsion type reaction disclosed by U. S. Patent 2,160,054. The polymer preferably possesses a molecular weight within the range of 15,000 to 250,000 or even higher, as calculated from viscosity measurements by the Staudinger equation:

$$\text{Molecular weight} = \frac{N_{sp}}{K_m C}$$

wherein:

$K_m = 1.5 \times 10^{-4}$ $N_{sp} = \text{specific viscosity} = \frac{\text{viscosity of solution}}{\text{viscosity of solvent}} - 1$, and $C$ = concentration of the solution expressed as the number of moles of the monomer (calculated) per liter of solution.

The molecular weight of the polymer obtained is dependent on such factors as the concentration of the monomer in the water, the amount and type of catalyst present, the temperature of the reaction, etc. Increasing or decreasing the amount of the catalyst, while maintaining the other conditions constant, decreases or increases the molecular weight of the polymer. Acrylonitrile copolymers and interpolymers containing at least 85% by weight of acrylonitrile and likewise preferably possessing a molecular weight of 15,000 to 250,000 or higher can be prepared in a similar manner.

As disclosed in the example the present invention is particularly applicable to the production of filamentary articles that have a basis of at least 85% by weight of polyacrylonitrile. Of course, however, useful films and foils may also be produced in this manner, as shown in the example. Filamentary articles may be produced by extruding the impregnated material through orifices and continuously collecting the extruded materials on rotating drums or the like, preferably at a rate in excess of that at which they emerge from the orifices so that drawdown is applied while they are still in a more or less flowable condition. Preferably, the materials are extruded while at elevated temperatures. Heating may be accomplished by any suitable means, as, for example, electrically or by means of a steam coil.

In the fixing step, the extruded materials are received directly after leaving the extruding orifices in a cell containing a gaseous, vaporous or liquid medium. In dry spinning the medium has a composition that is maintained at such a temperature and pressure that any tendency for rapid changes in the composition or physical state of the extruded material is reduced. The pressure of the evaporative or coagulative medium is preferably maintained in the neighborhood of that corresponding to the vapor pressure of the aqueous impregnant at the temperature of extrusion. By so doing any tendency of the impregnant to flash off at a reduced pressure, for example, atmospheric pressure, and consequently disrupt the fibers or leave large holes therein is obviated. This pressure will ordinarily be nominal, i. e. 1 to 5 atmospheres, since the pressure in the autoclave is expended in extruding the material and the only necessity for a receiving pressure vessel at all is the high vapor pressure of the aqueous impregnants at the elevated extrusion temperatures.

The evaporative medium employed in dry-spinning of filaments and yarns or the dry-casting of films in accordance with this invention may be any vapor inert to the film or filament-forming impregnated polymer, such as air, nitrogen, steam or any suitable mixture thereof. The temperature of the evaporative medium is dependent on such factors as the dimensions of the spinning cell, the composition and rate of extrusion of the impregnated mixture and the rate of flow of the evaporative medium. It is only necessary that these several factors be so correlated that the yarn or other shaped article leaving the spinning cell is sufficiently free of the impregnants so that the article is solidified and is capable of being wound to package form or otherwise collected.

Furthermore, shaped articles of acrylonitrile polymer can also be formed by extruding the impregnated polymer into a suitable bath comprising a liquid that coagulates the polymer and is chemically inert toward the acrylonitrile polymer. As examples of such liquids, may be mentioned water, glycerine, organic solvents, such as alcohol, ether, etc. or aqueous solutions of salt, alkali or acid.

Distribution of all of the non-solvent impregnant and other agents should be as uniform as possible throughout the polymeric composition before introducing the plastic mass into the autoclave for extrusion. This uniformity of composition may be obtained by mixing or stirring together the impregnant and the acrylonitrile polymer or by a milling operation wherein the agents and polymer are worked between rotating rollers until a mass of the desired consistency and composition is obtained.

The water used as the non-solvent impregnant in this invention for the formation of shaped articles from acrylonitrile polymers may be present in amounts as high as 90% of the total composition and as low as 20%. The use of too much water leads to explosive evaporation of steam at the spinneret orifices. Spinning has been accomplished with as little as 33% water which percentage is near the minimum amount which can be used. An amount of water within the ranges of 30% to 85% is preferred.

The pressure to be used to extrude the impregnated acrylonitrile polymers to form shaped articles is largely dependent upon the particular impregnant used, the amounts of such in the mass to be extruded and the temperature at which the extrusion takes place. Generally speaking, however, it can be said that pressures ranging from as low as 250 lbs. per square inch up to 25,000 lbs. per square inch or even higher may be used. In the process of this invention wherein water is employed as the impregnant, a pressure range of from 10,000 to 20,000 lbs. per square inch is preferred. The pressure can be applied in any convenient manner as by means of a hydraulically operated piston.

While it has been disclosed that this method of forming shaped articles from acrylonitrile polymers is carried out preferably at a temperature 150° C.–170° C., it is, of course, to be understood that these temperatures do not represent the operative limits. For example, depending upon the pressure, amount and type of impregnant, etc., the temperature may be as low as 100° C., or as high as 200° C. It will normally not be advisable to go above this upper limit since excessive heating leads to decomposition of the acrylonitrile polymers. When water is employed as the impregnant temperatures of from 150 to 170° C. are preferred.

The yarns, films, monofils and other shaped articles obtained by this process can be advantageously subjected to a stretching operation of the type commonly used in the textile art to increase the tenacity and reduce the elongation of a synthetic fiber-forming material. This stretching of the formed article may be performed at any suitable time and at any desired draw or stretch ratio within the limits of the material. In the case of articles formed by the process of the invention, it may be preferably performed before the article has been completely coagulated or dried. The orientation of the structure thus obtained greatly improves the physical properties of the structure, including its tenacity, resilience, etc.

The process of this invention is especially useful for the formation of shaped articles from acrylonitrile polymers without the use of solvents. Filaments, films, monofils, yarns or other shaped articles may be easily formed by the process described herein. The impregnant employed may be allowed to remain in whole or in part in the shaped article, if desired. The use of water as the non-solvent impregnant is particularly advantageous when it is desired to produce an impregnant-free shaped article, for the water may be readily and economically removed.

This process represents a method whereby it is not necessary to use solutions of acrylonitrile polymers in the formation of shaped articles. This is a distinct advantage since most of the acrylonitrile polymer solvents are expensive. Further, the aqueous non-solvent impregnants described herein are very cheap. With certain of them, such as water, there is no recovery problem. This invention provides a saving in the cost and this factor is of considerable commercial importance in the exploitation of the acrylonitrile polymers. Again, the process of this invention for forming shaped articles from acrylonitrile polymers is important since it represents a process whereby it is not necessary to use large amounts of solvents in order to form filaments, fibers, monofils, etc. This represents a considerable saving since it is not necessary to install a large solvent recovery system in order to achieve a commercially satisfactory process. It has an advantage over wet-spinning processes in that complicated drying steps are obviated.

It is indeed surprising that the hydrophobic acrylonitrile polymers can be successfully pressure extruded through the use of hydrophilic materials such as aqueous impregnants disclosed herein. Normally, at elevated temperatures acrylonitrile polymers containing at least 85% of acrylonitrile decompose and are not converted to a fused state. By incorporating a foreign material, such as water, which is normally shed by the polymers, one can pressure extrude the non-solvent impregnant/polymer composites at certain elevated temperatures without decomposition with the formation of useful shaped articles. This unexpected result allows for the avoidance of the use of expensive polymer solvents.

Any departure from the above description which conforms to the present invention is intended to be included within the scope of the claims.

I claim:

1. A process for the production of shaped articles from acrylonitrile polymers containing at least 85% acrylonitrile which comprises impregnating said polymers in comminuted, solid form with from 30% to 85% water; heating the resultant impregnated polymers in an enclosed chamber; exerting pressure on said impregnated polymers contained in said chamber, thereby extruding them through shaped orifices; and setting the resultant shaped articles.

2. A process in accordance with claim 1 wherein said polymer is polyacrylonitrile.

3. A process in accordance with claim 1 wherein said polymer is a polymer of acrylonitrile and 2-vinyl pyridine.

4. A process in accordance with claim 1 wherein said polymer is a polymer of acrylonitrile and styrene.

5. A process for the production of shaped articles from acrylonitrile polymers containing at least 85% acrylonitrile which comprises impregnating said polymers in comminuted, solid form with from 30% to 85% water; heating the resultant impregnated polymers in an enclosed chamber to a temperature of from 150° C. to 170° C.; exerting pressure on said impregnant polymers contained in said chamber, thereby extruding them through shaped orifices; and setting the resultant shaped articles.

6. A process in accordance with claim 5 wherein a pressure of from 10,000 to 20,000 pounds per square inch is applied.

7. A process in accordance with claim 5 wherein a pressure of from 10,000 to 20,000 pounds per square inch is applied and the polymer is polyacrylonitrile.

CHARLES D. COXE.

REFERENCES CITED

The following references are of record in the file of this patent:

UNITED STATES PATENTS

| Number | Name | Date |
| --- | --- | --- |
| 2,163,636 | Spanagel | June 27, 1939 |
| 2,214,442 | Spanagel | Sept. 10, 1940 |
| 2,404,717 | Houtz | July 23, 1946 |
| 2,425,086 | D'Alelio | Aug. 5, 1947 |